Oct. 28, 1941.                R. W. LUCE                2,260,531
                               LOCK NUT
                          Filed Feb. 2, 1939
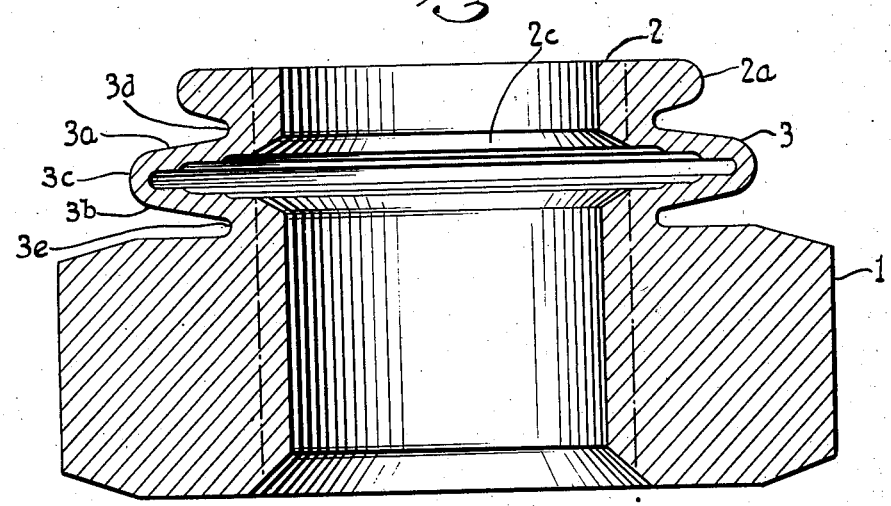
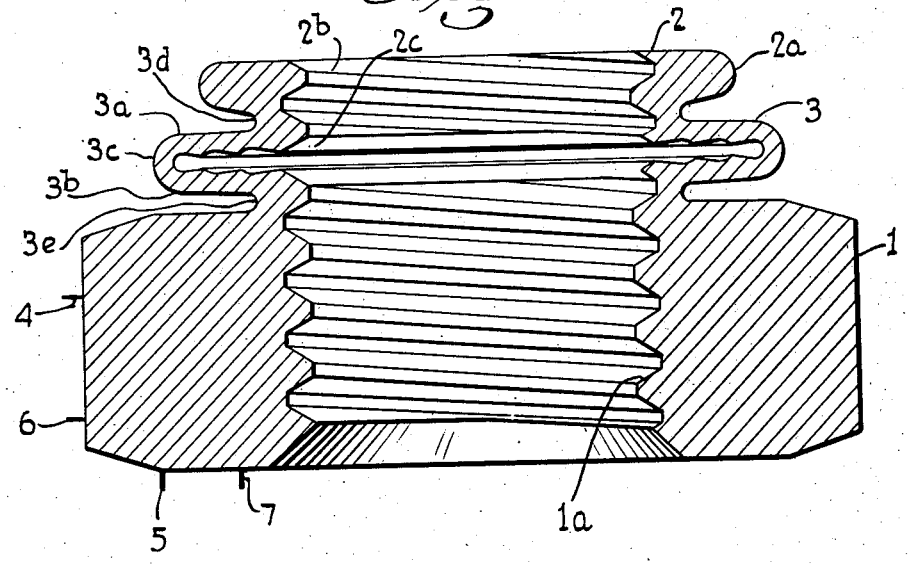
INVENTOR
RICHARD W. LUCE
BY
George T. Gill
ATTORNEY Patented Oct. 28, 1941

2,260,531

UNITED STATES PATENT OFFICE 2,260,531

LOCK NUT

Richard Waterman Luce, Westfield, N. J.

Application February 2, 1939, Serial No. 254,216

6 Claims. (Cl. 151—21)

The invention herein disclosed relates to a lock-nut of the type including a tapped body portion having the load carrying threads, another tapped portion displaced from the body portion and a resilient portion between the two tapped portions. Such a lock-nut is disclosed in my United States Patent No. 2,196,637 of April 9, 1940.

The lock-nut disclosed in the aforementioned application is constructed from a single piece of metal and consists of three portions, a tapped body portion having the load carrying threads, another, smaller tapped portion displaced from the body portion, and a bellows-like resilient portion between the two tapped portions. The bellows-like resilient portion consists of two, axially displaced, substantially radial wall sections joined at their circumferential edges in a curved circumferential wall section. The smaller tapped portion is a tapped cylinder having an outer radius equal to the inner radius of the radial wall section of the resilient portion. The threads of the nut are interrupted at the resilient portion and the threads of the two tapped portions are normally out of phase such that when a bolt passes one tapped portion and enters the other it causes the resilient, bellows-like portion to expand. The load carrying threads of the body portion are thus caused to engage, in frictional contact, the threads of the bolt. This frictional force, between the threads of the nut and the bolt, effectively maintains the nut on the bolt against the loosening action of forces of vibration.

The invention herein disclosed has for an object to provide a lock-nut of this general type that has certain constructional advantages and features that render the lock-nut more adaptable and suitable to its intended function. The lock-nut constructed in accordance with the invention includes a reinforced smaller tapped portion, a smooth frustro-conical surface for the bolt to act against in expanding the resilient portion of the lock-nut, and an arrangement and proportioning of the several portions of the lock-nut for effecting a uniform action of the lock-nut and for facilitating its construction.

A lock-nut embodying the invention is disclosed in the accompanying drawing in which:

Fig. 1 is a longitudinal section of a blank prior to being tapped; and

Fig. 2 is a longitudinal section of the finished nut.

The lock-nut illustrated in the drawing essentially consists of three portions, a tapped body portion 1 a smaller tapped portion 2 axially displaced from the body portion and a bellows-like, resilient portion 3 uniting the two tapped portions. In the finished nut, the threads of the two tapped portions are out of phase. When the nut is screwed on a bolt, the bolt first enters the body portion and then the smaller tapped portion. On entering the smaller tapped portion, it must expand the bellows-like, resilient portion until the threads thereof coincide with the threads of the bolt. The expanded bellows-like, resilient portion exerts a force tending to draw the two tapped portions together and in consequence draws the threads of the body portion of the nut into frictional engagement with the threads of the bolt. This frictional force is sufficient to prevent loosening of the nut on the bolt by virtue of forces resulting from vibration.

The nut blank, shown in Fig. 1, is preferably cut from hexagonal bar stock. The body portion of the nut retains the hexagonal configuration of the bar stock. This portion of the nut has the load carrying threads 1a cut therein.

The smaller tapped portion 2 is axially spaced from the body portion and has formed thereon a reinforcing bead 2a. The threads 2b formed in this portion of the nut are formed at the same time and with the same tap with which the threads of the body portion are formed. These threads are therefore identical with the threads of the body portion and the threads of these two tapped portions are in lead with respect to each other. The tap is run through the blank shown in Fig. 1 to form these threads and the reinforcing bead 2a prevents the smaller tapped portion from spreading as the tap goes through. Without this bead 2a the smaller tapped portion has a tendency to spread and the threads thereof are not always cut uniformly or to the proper depth.

As more clearly seen in Fig. 2, there is formed, at the inner end of the smaller tapped portion, a smooth conical surface 2c, preferably making an angle with a plane normal to the axis of the nut equal to the thread angle. This smooth conical surface is engaged by a bolt entering the smaller tapped portion and overcoming the force of the resilient portion 3. By providing such a surface, the end of the bolt is not scratched or otherwise injured. Without some such surface, the plating on the end of a plated bolt may be broken, as by being scratched, on entering the smaller tapped portion.

The bellows-like, resilient portion consists of two, substantially radial wall sections 3a and 3b joined at their outer end by a curved circumferential wall section 3c. The walls of the bellows-like, resilient portion are of substantially uniform thickness and less than the wall thickness of the thinnest part of either tapped portion including the thread. At the inner end, the wall section 3a is joined in a smooth curve 3d of a single radius to the smaller tapped portion and the inner end of the wall section 3b is joined to the body portion in a smooth curve 3e of a single radius. Except for the point of unification of the wall section 3a to the smaller tapped portion and of the wall section 3b to the body portion, the bellows-like resilient portion is out of contact with the tapped portions. The wall sections 3a and 3b are spaced from the smaller tapped portion and the body portion respectively a distance at least equal to the thickness of the wall section, and they are spaced apart a distance greater than the thickness of a wall section, approximately twice the thickness of a wall section. This arrangement provides a free bellows like resilient section in which the resiliency is primarily in the form of a bending moment about the arcuate circumferential wall section 3c. A uniform axial force is thus provided upon expansion of the resilient portion. Preferably, the nut is made from a metal having from ten to twenty-five percent elongation, i. e. in two inches at the ultimate strength, to provide the desirable workability and resiliency.

A nut such as that illustrated and described in detail above, provides a uniform axial force that causes, when the nut is threaded on a bolt, the load carrying threads of the body portion to engage in frictional contact the threads of the bolt. This force is exerted primarily as the result of a bending action, within the elastic limit of the material, of the wall section 3c. In consequence, the bellows-like resilient portion has a greater range of movement before taking a set than would be the case were the action purely one of tension or compression. The action of the resilient, bellows-like portion is such that irrespective of the tolerances, within the limits of commercial practice, in the threads of a nut and bolt it will be sufficient to effect a pressure contact at all times between the threads and the bolt upon which it is threaded. and the magnitude of the force exerted is such that it does not injure the threads.

When made of steel, particularly of a low carbon steel, below 35 carbon (0.35% carbon) and approximately 15 carbon (0.15% carbon), for example, the efficacy of the spring section may be greatly enhanced by case hardening and drawing the case to a spring temper. Steels of low carbon have the characteristic of high machinability. When the nuts made of such steel are case hardened to a depth of from 10 to 25% of the thickness of the wall section and drawn to a spring temper, the spring section has much greater resiliency. The depth of the case hardening will vary depending upon the type of case hardening, i. e. cyanide or carborized. Nuts of a higher carbon than 35 may be heat treated to enhance the characteristics and effectiveness of the spring section.

If it be desired to reduce the weight of locknuts of this or similar types, as for example, when large quantities are used on airplane structures, the body of the nut may be turned down from the lower face to a point indicated by the line 4, leaving a diameter of this lower portion equal to the face of the nut indicated by a continuation of the line 5. To further reduce the weight of the nut the section between the line 4 and a line 6 may be undercut to a depth represented by a continuation of a line 7. The nut so cut down has the same face area and the portion from the line 4 to the top of the body of the nut provides a hexagonal portion for applying a wrench to the nut. The strength of the nut, from the standpoint of its function is not materially altered by the removal of this material and its weight is considerably reduced.

It will be obvious that various changes may be made by those skilled in the art in the details of the lock-nut illustrated in the drawing and described in detail above within the principle and scope of the invention as expressed in the appended claims.

I claim:

1. A lock-nut comprising in a single piece of steel, a tapped body portion having the load carrying threads therein, a smaller tapped portion axially spaced from the body portion and having the threads thereof out of phase with the threads of the body portion, and a resilient portion between the two tapped portions including spaced, substantially radial wall sections of substantially uniform thickness, the nut being heat treated to increase the resiliency and yield point of the resilient portion.

2. A lock-nut comprising in a single piece of steel, a tapped body portion having the load carrying threads therein, a smaller tapped portion axially spaced from the body portion and having the threads thereof out of phase with the threads of the body portion, and a resilient portion between the two tapped portions including spaced, substantially radial wall sections of substantially uniform thickness, the nut being case hardened and the resilient portion drawn to a spring temper.

3. A lock-nut comprising in a single piece of steel, a tapped body portion having the load carrying threads therein, a smaller tapped portion axially spaced from the body portion and having the threads thereof out of phase with the threads of the body portion, and a resilient portion between the two tapped portions including spaced, substantially radial wall sections of substantially uniform thickness, the nut being case hardened to a depth not exceeding twenty-five percent of the wall thickness of the resilient portion.

4. A lock-nut comprising in combination a tapped body portion having the load carrying threads therein, a bellows-like resilient portion at one end of the body portion including spaced, substantially radial walls, one extending and spaced from the body portion and joined thereto in a smooth curve, a smaller tapped portion connected with the resilient portion and axially spaced from the body portion, the resilient portion normally maintaining the two tapped portions with the threads thereof out of phase, and a circumferential reinforcing bead on the smaller tapped portion extending radially outwardly beyond the inner end of the other radial wall of the resilient portion, axially spaced therefrom and joined thereto in a smooth curve.

5. A lock-nut comprising a tapped body portion having the load-carrying threads therein, a smaller tapped portion axially displaced from the body portion, a resilient portion between the two tapped portions normally maintaining the smaller tapped portion positioned with respect to the body portion with the threads thereof out of phase in a direction towards the body portion, and an internal smooth, conical, pressure contact surface joining the resilient portion and the smaller tapped portion for engaging a bolt entered in the nut and effecting expansion of the resilient portion to bring the thread thereof into coincidence with the thread on the bolt.

6. A lock-nut comprising in combination a tapped body portion having the load carrying threads therein, a bellows-like resilient portion at one end of the body portion including spaced, substantially radial walls, one extending and spaced from the body portion and joined thereto in a smooth curve, a smaller tapped portion connected with the resilient portion and axially spaced from the body portion, the resilient portion normally maintaining the two tapped portions with the threads thereof out of phase in a direction towards the body portion, a circumferential reinforcing bead on the smaller tapped portion extending radially outwardly beyond the inner end of the other radial wall of the resilient portion, axially spaced therefrom and joined thereto in a smooth curve, and an internal smooth, conical, pressure contact surface joining the resilient portion and the smaller tapped portion for engaging a bolt entered in the nut and effecting expansion of the resilient portion to bring the thread thereof into coincidence with the thread on the bolt.

RICHARD W. LUCE.